United States Patent [19]

Buddendeck et al.

[11] Patent Number: 5,382,015

[45] Date of Patent: Jan. 17, 1995

[54] DOCUMENT HANDLER PLATEN TRANSPORT HAVING A BELT URGING SYSTEM

[75] Inventors: Mark H. Buddendeck, Macedon; Gerald R. Curry, Lima; Kelly J. Zastrow, Mendon, all of N.Y.

[73] Assignee: Xerox Corporation, Stamford, Conn.

[21] Appl. No.: 268,909

[22] Filed: Jun. 30, 1994

Related U.S. Application Data

[63] Continuation of Ser. No. 61,333, May 12, 1993, abandoned, which is a continuation of Ser. No. 814,521, Dec. 30, 1991, abandoned.

[51] Int. Cl.⁶ .............................................. B65H 5/02
[52] U.S. Cl. ..................................... 271/275; 355/75; 1/271
[58] Field of Search .................... 271/6, 7, 3, 3.1, 275, 271/198, 274; 355/75, 76, 230

[56] References Cited

U.S. PATENT DOCUMENTS

| | | | |
|---|---|---|---|
| 2,444,170 | 6/1948 | Sabel et al. | 271/7 |
| 3,747,918 | 7/1973 | Margulis et al. | 271/275 X |
| 3,937,454 | 2/1976 | Colwill | 271/3.1 X |
| 3,944,214 | 3/1976 | Fallos et al. | 271/275 X |
| 3,944,367 | 3/1976 | Hakanson et al. | 355/76 |
| 3,988,019 | 10/1976 | Achelpohl | 271/180 |
| 4,043,665 | 8/1977 | Caldwell | 355/76 |
| 4,190,185 | 2/1980 | Thate | 271/274 X |
| 4,284,348 | 8/1981 | Graswinckel | 271/275 X |
| 4,314,696 | 2/1982 | Graef | 271/275 |
| 4,440,492 | 4/1984 | Howard | 271/275 X |
| 4,669,721 | 6/1987 | Westover | 271/272 |
| 4,831,419 | 5/1989 | Iaia, Jr. et al. | 271/245 X |
| 4,844,445 | 7/1989 | Murata et al. | 271/275 |
| 5,110,103 | 5/1992 | Miyoshi et al. | 271/3 |
| 5,127,642 | 7/1992 | Takimoto et al. | 271/7 X |

FOREIGN PATENT DOCUMENTS

| | | | |
|---|---|---|---|
| 98635 | 3/1982 | European Pat. Off. | 271/7 |
| 2308571 | 11/1976 | France | 271/275 |
| 3513331 | 10/1986 | Germany | 355/75 |
| 260033 | 12/1985 | Japan | 355/75 |

OTHER PUBLICATIONS

Xerox Disclosure Journal, Thomas N. Taylor, et al. Document Registration with "SKI" Assisted Scuffer Wheel vol. 7, No. 6, Nov./Dec. 1982.

Primary Examiner—Robert P. Olszewski
Assistant Examiner—Boris Milef

[57] ABSTRACT

A document handling system adapted for delivery of documents to an imaging station of an imaging input terminal. The system includes a driven friction belt for transporting the documents across a platen of the imaging station. The belt is urged into planar orientation with the platen by slider plates which are ski-like members that bear upon the belt. The slider plates are arranged to bear upon the margins of the imaging area to smooth documents on the belt and to urge such document onto the platen, thus providing an improved imaging of documents delivered to the imaging station.

11 Claims, 5 Drawing Sheets

DOCUMENT HANDLER PLATEN TRANSPORT HAVING A BELT URGING SYSTEM

This application is a File Wrapper Continuation of application Ser. No. 08/061,333, ; filed May 12, 1993, in which application Ser. No. 08/061,333 was a Continuation of abandoned application Ser. No. 07/814,521, filed Dec. 30, 1991, now abandoned.

FIELD OF THE INVENTION

This invention relates generally to a document handling device and, more particularly, to an improved transport and positioning device for use in driving copies, documents and other sheet-like materials across a flat surface.

BACKGROUND OF THE INVENTION

In a typical document handler of the type often used with image input terminals such as those used for providing an electronic digital image (e.g., raster input scanners) or light-lens optical imaging system for imaging an original image and exposing a recording media, a sheet-like member hereinafter referred to as a document is transported from a document input station to an imaging station.

The transport of the document from the document input station to the imaging station generally is accomplished by a series of belts and/or rollers which engage the document to move it along a predetermined path in a registered fashion. The registered document is then delivered to a friction belt which moves the document over the imaging station surface to an imaging position on the imaging station surface hereinafter referred to, generally, as the platen.

When using a properly adjusted image input terminal to image documents on a platen, optimum results are provided when the document is presented parallel to the platen, and, generally, flush against the platen. Thus, any rippling of the document or any portions of the document outside the normal range of the scanner (e.g., the belt or portions thereof to which the sheet-like material adheres is away from the belt) results in a poor image.

This problem has become even more severe with time, as optical imaging systems and even electronic imagers are using systems which have a relatively short conjugate length. The use of such lenses or optically effective systems enhances imaging quality and reduces the size of such systems. Nevertheless, there are sacrifices, as there is the loss of the "forgiveness" of a longer conjugate length input system. Thus, the areas, where these problems exhibit themselves most often, are the portions of the documents away from the center of the imaging area of the platen, because as the distance from the center of the imaging area increase, the shorter conjugate length of the imaging systems cannot compensate for distances the sheet-like material may be lifted off the platen. Thus, even slight bunching of the sheet-like material or raising of the sheet-like material in the margin areas of the image input system result in a faulty input image received by the imaging system.

The use of friction belts to transport documents and other like sheet material across the platen presents several competing constraints. First, the belt and sheet-like material must have a high degree of adherence, compared to that between the sheet-like material and the platen and between the belt and the platen. Further, the wear on the materials of the belt, documents, and the platen should be minimized. It is also desirable to reduce the load on the motors which drive the belt, so that less powerful motors can be used to further reduce costs and/or maintenance time. As seen above, proper registration of the document on the platen is imperative in the vertical direction.

Proper registration of the document in the horizontal plane is also critical, as failure to maintain the registration of the sheet-like material, as it moves with the belt, generally results in a faulty image (Portions in non-imageable areas, skewed orientation, and the like).

Thus, the friction between the belt and paper must be greater than the friction between the paper and the platen and between the belt and the platen. These constraints exist because the sheet-like material must not stack, slip, hesitate or otherwise buckle as it moves on the belt across the platen. Otherwise, documents would frequently be presented in a non-registered condition at the imaging station.

To summarize these points, document handling systems must, therefore, move the sheet-like material without it slipping and sticking of the sheet-like material relative to the belt. It is preferred to have a system which also reduces belt and motor wear. Yet, it is also desired to increase the part life of the belt and motor and to reduce costs generally. The problems of wavy-line copies and out-of-focus copies of prior systems have become more acute as shorter conjugate optics are used to reduce the size and increase the effectiveness of input imaging terminals in copiers and scanners. These faulty copies result generally from a buckling of the document away from the platen or the document being held on the belt away from the platen. Thus, maintaining a document to be imaged in a flat attitude relative to the platen and proximate to the platen are necessary to avoid optical distortion and retain the document in focus.

The mechanical pressure members most often used to bear upon friction belts are elongated rollers which bear on the friction belt. Unfortunately, these rollers often cause several undesirable effects. First, they tend to be separated by a distance so that wavy, out of focus lines occur too frequently on copies produced from the image recorded by the image input terminal. These roller members also tend to bear relatively heavily on the portion of the platen over which they are positioned causing wear of the platen. This is unacceptable, since platens are often optically coated to achieve imaging performance or coated with a transparent film to reduce paper drag,. It also is wasteful, even for non-coated platens, because it reduces the useful life of the platen and also the quality of the images produced also decreases with time. Further, the area of the belt opposite the platen and at the extreme ends of the rollers often build up dirt. This results in darkening of copies produced thereby.

Various techniques have heretofore been used to provide a pressuring loaded to a friction belt in a document handler, as illustrated by the following disclosures, which may be relevant to certain aspects of the present invention:

U.S. Pat. No. 3,988,019
Patentee: Achelpohl
Issued: Oct. 26, 1976
U.S. Pat. No. 4,669,721
Patentee: Westover
Issued: Jun. 2, 1987

U.S. Pat. No. 4,190,185
Patentee: Thate
Issued: Feb. 26, 1980
U.S. Pat. No. 3,937,454
Patentee: Colwill
Issued: Feb. 10, 1976
Publication: Xerox Disclosure Journal
Author: Thomas W. Taylor, et al.
Issue: Vol. 7, No. 6, Nov./Dec. 1982

The relevant portions of the foregoing patents may be briefly summarized as follows:

U.S. Pat. No. 3,988,019 discloses an apparatus for depositing flat flexible articles on one double belt conveyor to another double belt conveyor by two ski like members. The members cooperating to push the cuticle down and of the first double belt conveyor to the second belt conveyor.

U.S. Pat. No. 4,669,721 discloses a sheet transporting apparatus which has a belt and a flexible elongated guide between which sheets pass. The flexible guide bears upon the sheet to maintain it proximate to belt to move the sheet between the belt and guides which may be a singular piece of several parallel members.

U.S. Pat. No. 4,190,185 discloses a first and second conveyor belt for transporting sheet material. The central portion of he sheet material is intended to be unsupported and not in contact with the belt. Engagement elements 3 engages the edges of the sheet to tension it and urge it into a planar flattened condition.

U.S. Pat. No. 3,937,454 discloses document recirculator for feeding documents over a platen. The belt is maintained in close proximity to the platen for moving documents by a fixed plate over the belt and inflatable bladder positioned between the plate and the belt.

Volume 7, No. 6, of the Xerox Disclosure Journal discloses a ski-like member which is mounted to a scuffer wheel to effect registration of a document. The scuffer wheel is so mounted to the ski-member that buckling of the document reduces the force applied by the scuffer wheel to the document.

All references cited in this specification, and their references, are incorporated by reference herein where appropriate for appropriate teachings of additional or alternative details, features and/or technical background.

SUMMARY OF THE INVENTION

The present invention comprises a document feeder having a friction belt. Means for tensioning the belt are provided to urge the belt in close proximity to the platen. The tension means include a plurality of plates which are flexibly mounted.

This invention is embodied in a document handling system to feed documents to an IIT. The invention includes a friction belt for moving documents across a platen along a document path. The friction belt is driven and engages a document as it is passed in a registered condition to the belt's input edge from the document handling input in a registered. The belt is urged toward the platen by pressure members. The pressure members include slider plates which bear upon the belt to urge into close planar proximity with the platen so that documents transported thereby are presented to the imaging station in a registered planar condition flush against the platen. The slider plates are long and relatively thin members which extend between edges of the platen. A first set of the long thin elongated rollers are disposed at the upper and lower edges of the document imaging areas.

A further aspect of this invention is another slider plate which having a first and second portion each of are relatively shorter but wider than previously mentioned two slider plates between which the other slider plate is disposed. The trailing edge of one portion and the leading edge of the other are placed in close proximity to the edge of the platen.

Yet, another aspect of the invention is an improved system employing a plurality of gravity loaded slider plates for loading and tensioning a friction belt for transporting documents over a platen to an imaging station of an imaging input terminal. The slider plates are gravity loaded to urge and maintain the belt in substantially planar orientation proximate to the platen of the printer. A set of the slider plates oriented to bear on the belt over the upper and lower margins of the imaging portion of the platen surface in a first direction along a predetermined document path. Another slider plate is disposed between the set of slider plates and extends substantially from one edge of the platen to the other. The slider plates have a ski-shaped cross section.

DESCRIPTION OF THE DRAWINGS

Various of the above-mentioned and further features and advantages will be apparent from the specific apparatus and its operation described in the examples below. The present invention will be better understood by reference to the following description of this embodiment thereof, including the figures and references thereto wherein.

DETAILED DESCRIPTION OF THE PREFERRED EMBODIMENT OF THE INVENTION

Figure 1:
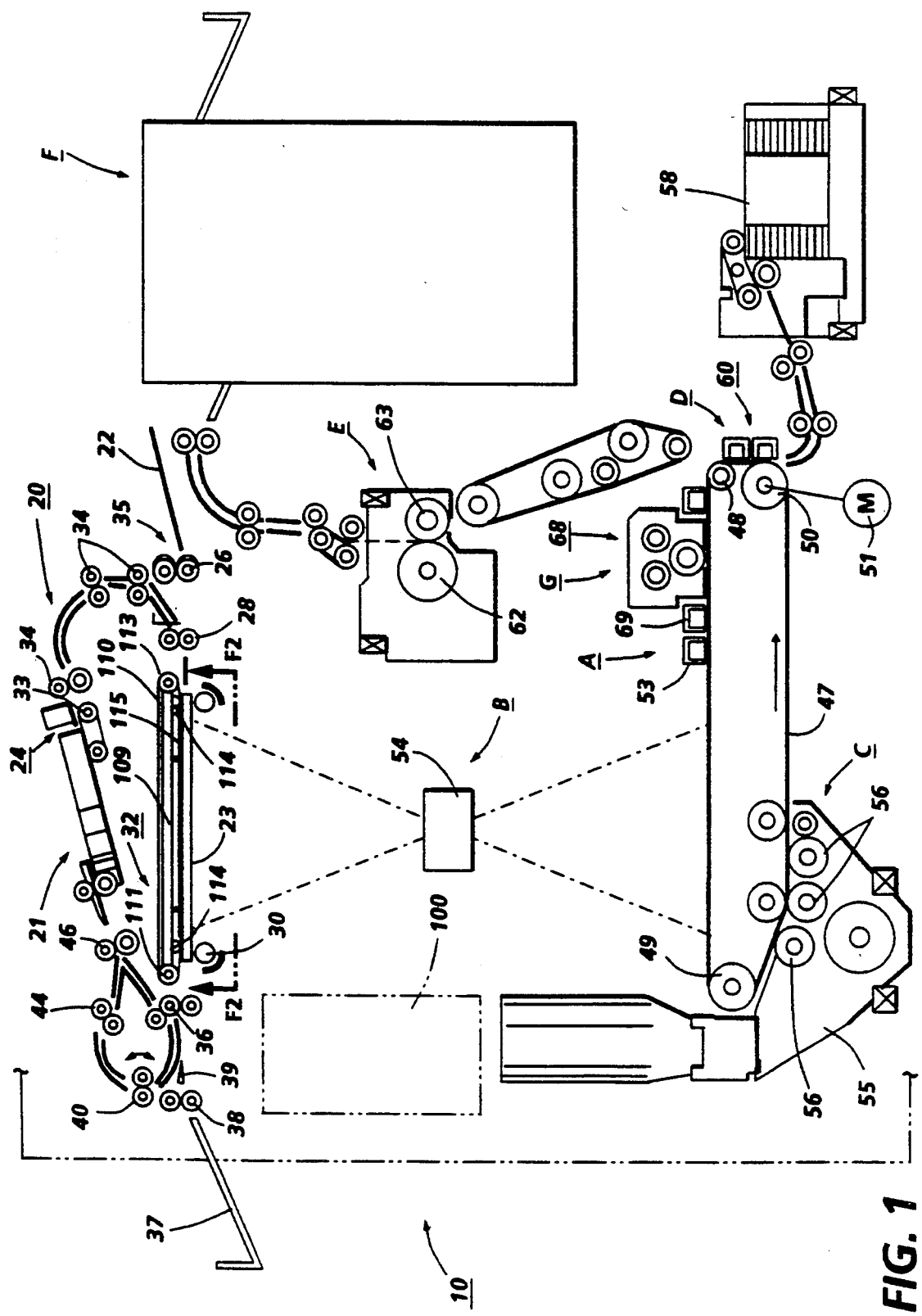
FIG. 1 is a side view schematic exemplary of a recirculating, plural mode document handier for a copier in which the present invention may be incorporated as shown in the other Figures.

Describing now in further detail the example illustrated in the Figures, there is a schematic shown in FIG. 1 a portion of an exemplary copier 10 with an exemplary document handling system 20 employing the present invention. In this exemplary document handling system 20, there is a recirculatory input stacking tray 21 and a side entrance shelf 22 for semiautomatic document system 25 into which documents may be individually inserted.

The recirculating document handler 24 (RDH) of the document handling system handling 20 provides for automatically transporting individual registered and spaced document sheets onto and over a conventional platen imaging station 23 of the copier 10, using a friction belt platen transport system 32 overlaying the platen 23. In this example, documents are fed one at a time from the bottom of a stack placed in the tray 21 by driven belt 33 to roller sets 34 which direct documents to driven rollers 28 and then to the friction belt transport system 32 for imaging.

Documents exiting the platen transport system 32 are then directed to the lower two of the three rollers 36. Documents fed from the semi-automatic shelf 22 are directed to output tray 37 via decision gate 39 and rollers 38.

Documents input from the tray 21 are directed by gate 39 to rollers 40 which can rotate in a first direction to receive document rollers 36 and then either direct the documents to rollers 44 or reverse rotation to redirect the document to pass between the upper two rollers of roller set 36. Documents passing through the upper two rollers of roller set 36 and those passing through the rollers 44 are directed back to tray 21 via roller sets 46. As apparent, the described arrangement of rollers provide for both simplex and duplex imaging of documents placed in tray 21. Documents input from the semi-automatic input are fed from shelf 22 through rollers 35 to the rollers 28.

As is conventionally practiced, the entire document handler system 20 is pivotally mounted to copier 10 so as to be liftable by the operator away from its active position adjacent the platen. Lifting the document handler away from the platen permits manual document placement on the platen, as well as convenient clearance of jams occurring in the transport system proximate to the platen. The document handler's system has external covers to cover the moving parts F, and which are not shown here for clarity.

The exemplary copier 10 of FIG. 1 conventionally includes a conventional photoreceptor belt 47 having a photoconductive surface on a conductive substrate and conventional xerographic stations acting thereon: charging station A, exposure station B, development station C, transfer station D, fusing station E, finish station F, and cleaning G. The belt 47 travels about stripper roller 48, tension roller 49 and drive roller 50 which is actuated by motor 51.

The copier functions in the manner now described. The photoreceptive belt 47 is charged at station A, by a corona generating device 53. The belt 47 then passes to an imaging/exposure station B, where in the exemplary copier show, a document on platen 23 which is imaged and exposed on the belt 47 by a light-lens optical input-/output system 54 to form a latent image on the belt 47.

The belt 47 with the latent image thereon then passes to the developer station C where toner is delivered to the surface of the belt to develop the latent image. In this case, the developer station is a housing 55 with magnetic brushes 56 whereby toner, triboelectrically bound to carrier beads, passes from the magnetic brushes 56 and the carrier beads, to the surface of the belt 47 to develop the latent image. The belt 47 then passes to the transfer station D.

At transfer station D, a copy sheet taken from the copy tray 58 is delivered for transfer of developed image thereto. The image is transferred from the belt 47 to the copy sheet due to the higher magnitude charge on the paper due to charging elements 60. The copy sheet with the transferred image is then passed to the fusing station E, where it passes between rollers 62 and 63. In this example, roller 63 is heated to permanently bond the transferred toner image to the copy sheet. The copy is then passed to the finishing station F for any further processing of the copy sheet, such as compiling with other copy sheets and/or binding, stapling and the like. The belt 47, after passing the transfer station D then passes to cleaning station G which is a brush cleaner unit 68. The belt is then discharged by source 69 to prepare for another cycle beginning in the charging station A.

Conventionally, the control of all placement feeding is by control unit 100, which is often a programmable microprocessor. Control units of this type generally control all document handler systems to functions and steps. The art readily teaches one to provide for a means and method to store and compare document and copy counts to recognize jam signals, to implement time delays and the like through the control unit 100. Further, the control units also control all of the imaging and printing functions and steps of copier 10.

Figure 2:
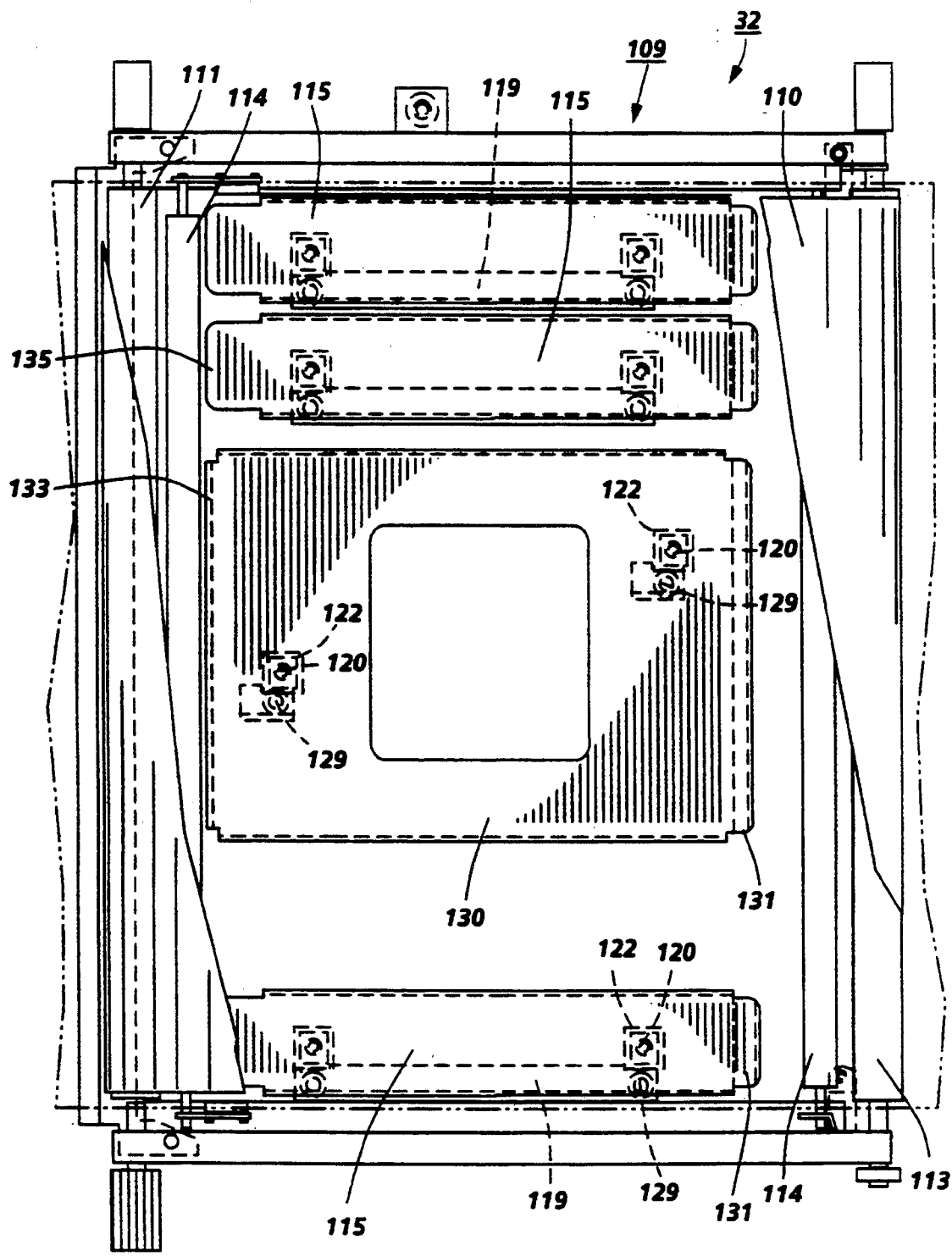
FIG. 2 is a view from the platen of FIG. 1 shown by view line A—A of the document handler of FIG. 1 with portions removed for clarity.

As shown in FIG. 2, a transport frame 109 of the transport systems 32 supports the friction belt 110, which in this case is broken away for clarity. The belt 110 rotates about drive roller 111 and the tension roller 113. Elongated rollers 114 rotatably supported by the frame 109 are disposed above the entry and exit edges of the platen 23. The rollers bear upon the belt 110. Elongated sliders or skis 115 are disposed above the upper and lower portions of the platen. The skis 115 extend substantially between the elongated rollers 114. The skis 115 have upwardly extending fingers 120 which extend through apertures 121 in brackets 122 of the frame 109 (see FIG. 6). A clip 123 engages a grooved portion of the fingers 120 to retain each of the fingers 120 in its associated aperture.

Figure 6:
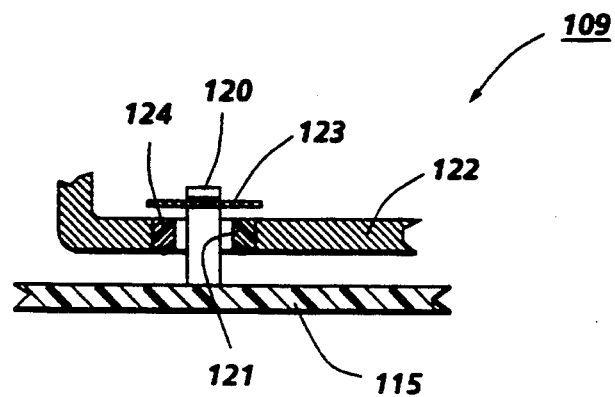
FIG. 6 is a view of mounting arrangement of the sliders to the document transport frame of the present invention.

Referring now to both FIG. 6 and FIG. 2, bearing members 124 are disposed along the wall of the apertures 121 to permit free movement of the fingers 120 in the apertures 121 along the longitudinal axis of the fingers 120. The apertures 121 and the bearing members 124, preferable formed of resilient, flexible member such as nylon, are oversized relative to the fingers 120 so that the fingers 120 are freely slidable in the associated aperture 121 and also permit slight lateral or rotational movement of fingers 120. Thus the skis 115, when the document handler is in the active position, bear on the belt 110 and urging it toward the platen. The skis 115 due to the mounting of the fingers 120 may move up and down depending on the normal force transmitted from the belt Further, the mount also provides some movement or freedom in the plane parallel to the platen. These movement freedoms are similar for all similarly mounted bodies hereinafter discussed. The brackets 122 are secured to the frame 109 by nuts 129. It will also be noted that the brackets 122 supporting each of the skis 115 are interconnected by an elongated portion 119.

Between the skis 115 is disposed a wide body 130 which extends across the platen 23 and is supported in substantially the same fashion as skis 115 with brackets 122 and finger 120 extending through apertures 121. Both the skis 115 and the wide body 130 have an upwardly extending portions 121 and 131 positioned toward the document entry portion of the platen 23. Although it is not shown here, it will be understood that to further reduce wear on the platen 23 at the exit tips 133 and 135 of the skis 115 and 130, the tips 133 and 135 can be curled slightly, similarly or even more severely as the lip 4.3 mm per 12 mm which in this case has a curve of 131. Further, in document handlers, particularly those having a dual directional feeding, skis having lips at both edges may also be appropriate.

In this embodiment the skis 115 are pre-loaded in the active position by gravity. It will be appreciated that in certain situations and construction of skis 115, that a spring or other loading device may be included to either load or negatively load the ski. For example, a coil spring disposed around finger 120 and between the bracket 122 and the ski 155. To bear on the ski and bracket will load the ski toward the platen. Whereas, placement of a coil spring on the finger 121 between the bracket 122 and retaining clip 123 will negatively load the skis 115.

Figure 3:
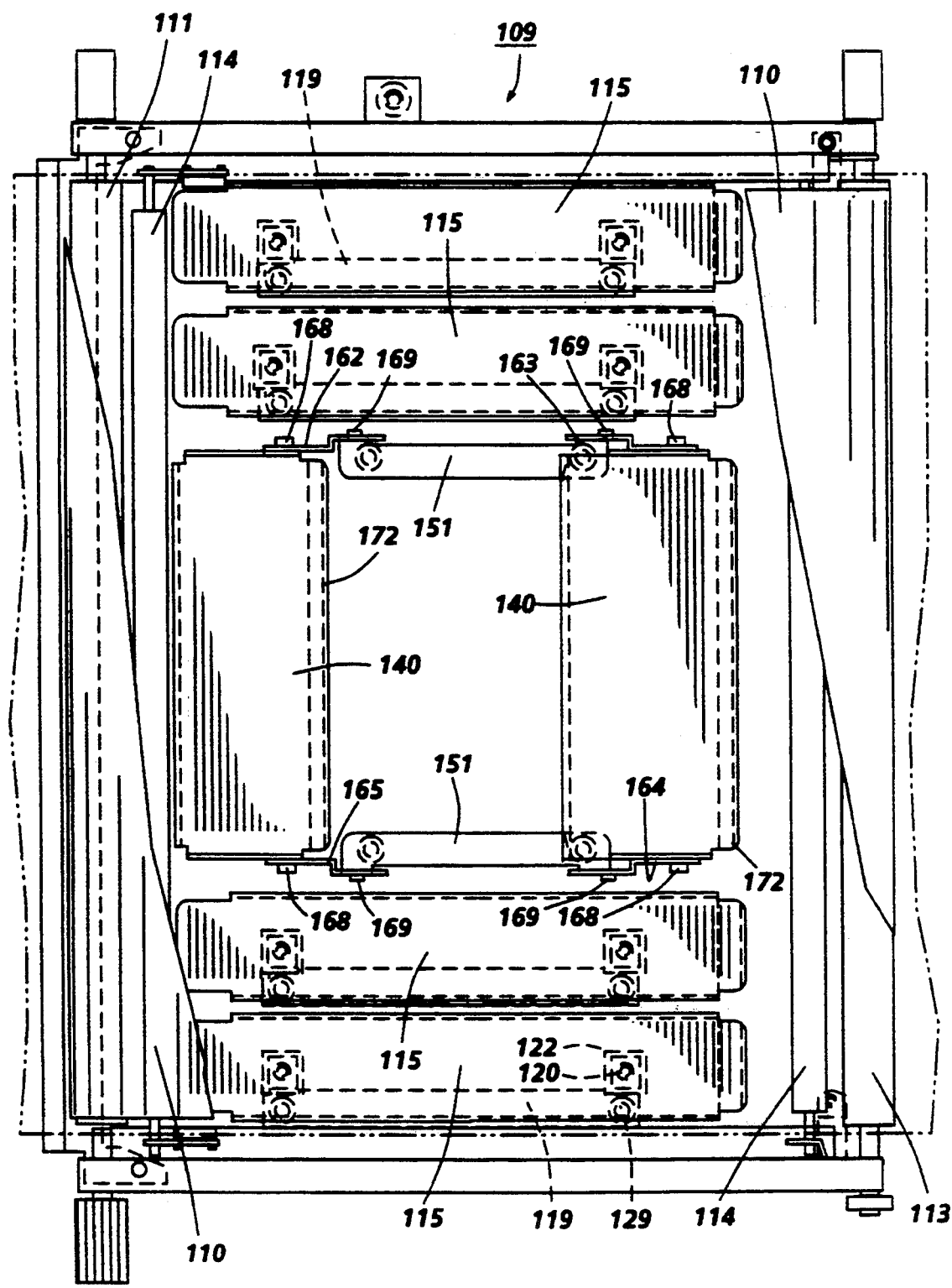
FIG. 3 is a view similar to FIG. 2 of an alternative embodiment of the present invention.

As shown in FIG. 3, an alternative embodiment of the present invention with wide skis 140 are pivotally mounted to the frame 109. Specifically, the skis 140 are suspended by a dual action swivel connection members 162, 163, 164 and 165, which have apertures therein for receiving and retaining projecting portions 168 and 169 of the skis 140 and brackets 151 respectively. The skis 140 are provided with an upward projecting portion 172 on the upstream side and may be provided with a similar portion on the demonstration side. Due to the difference in the mounting from the skis 115, the movement freedoms are somewhat more limited, although by structuring and sizing the projecting portions 168 and 169 and the apertures of the swivel connection members 162, 163, 164 and 165 similar movement freedom can be obtained.

Figure 4:
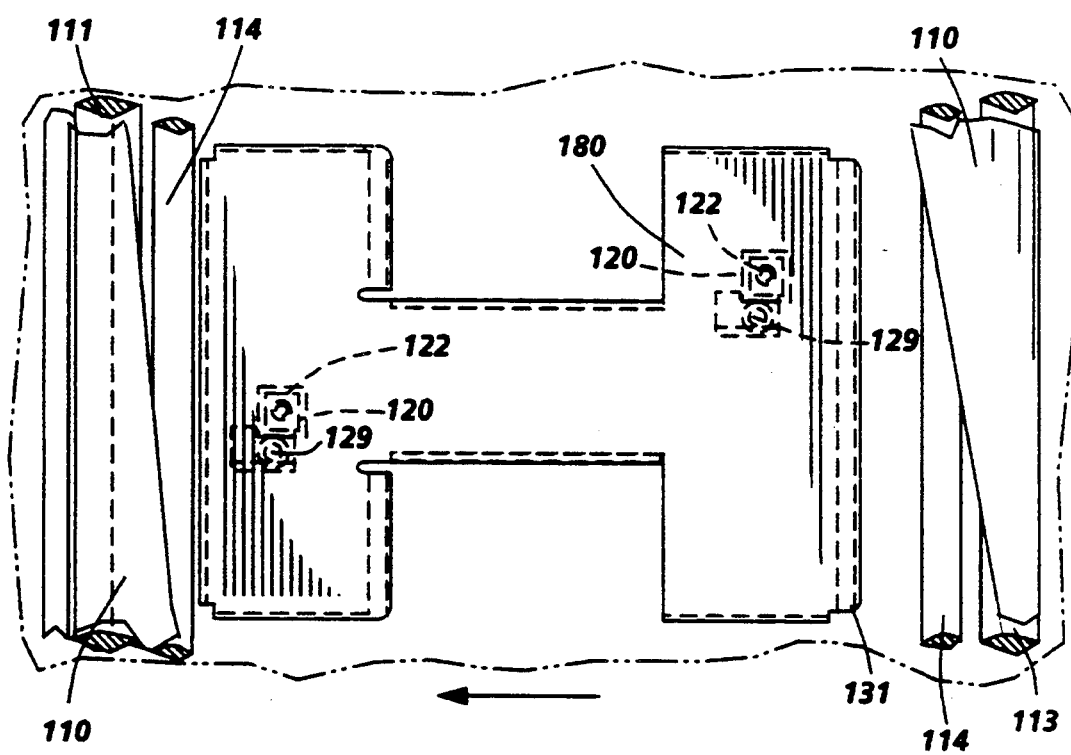
FIG. 4 is a partial elevational view from the platen similar to FIG. 2 of another embodiment of the present invention.
Figure 5:
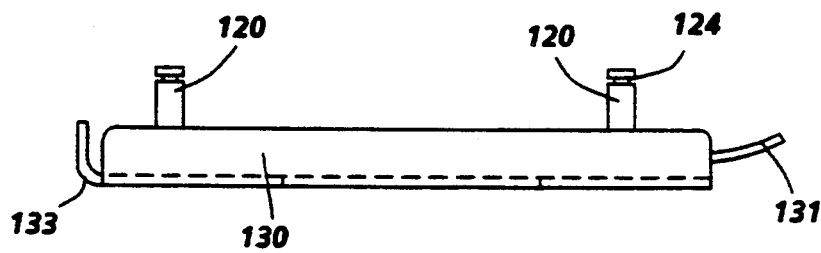
FIG. 5 is a side elevational view of the wide body of FIG. 2.

In FIG. 4, an H shaped central ski 180 is shown, which is similar in function and positioning to the ski 130 of FIG. 2 and the ski 140 of FIG. 3. The present invention is adapted to provide a distribution of weight across the platen. The ski members are relatively light construction of between 0.06 and 1.5 mm thick low carbon steel and preferably 0.8 mm. It will be understood that various coatings such as teflon or electrolytic coatings, or as preferred a non-electrolytic nickel steel can be used to reduce friction between the belt and skis. The skis disclosed and taught herein tend here to their increased area provide a belt surface on which the document to be imaged is maintained substantially parallel to the platen and in close proximity to it. Thus, resulting in fewer copied images exhibiting out of focus portions and fewer copied images exhibiting wavy lines.

Figure 7:
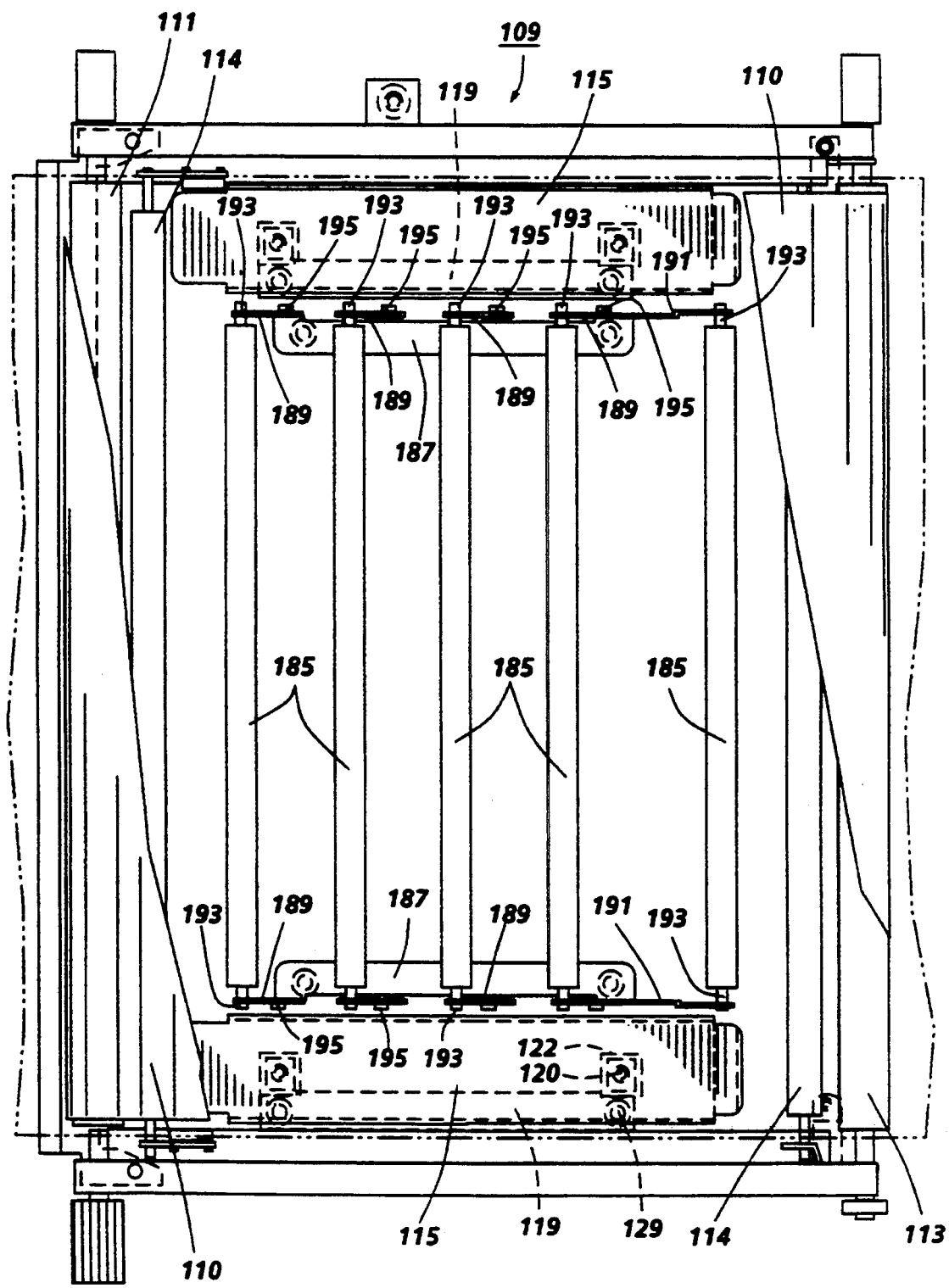
FIG. 7 is an elevational view from the platen similar to FIG. 2 of another embodiment of the present invention.

FIG. 7 shows an embodiment to this invention which has central rollers 185 disposed between elongated skis 115. The skis 115 are mounted in substantially the same fashion as those of FIG. 2. The rollers 185 are supported by the frame 109. The brackets 187 are attached to the frame, and the rollers 187 are interconnected with the brackets 187 by swivel connections 189 and 191. The rollers 185 have a center axle 193 about which they rate and upon which the rollers 185 are supported from the connections 189 and 191. The brackets 187 have extended portions 195 upon which the connections 189 and 191 are supported.

Thus, applicants have disclosed slider plates which provide a distributed force bearing upon friction belts particularly at the margin areas by the imaging plate. Thus, flat or parallel orientation of documents on the imaging surface platen are encouraged thereby. The equality of the weight distribution by having the plates reduces the overall weight on the belt. The relatively even distribution also encourages movement of the sheet-like material in a constant fashion without buckling, slippage, or other like problems. Further, it will be recognized that the reactive shape an of the ski-like members and the reactive suspension of the members also act to compensate or lessen forces as needed to reduce excessive wear and erosion forces. The distribution of the thin elongated ski-like member are along the upper and lower margins of the platen surface to provide a smooth belt surface to present a smooth document at these portions. Likewise, the use of the wide skis in the left and right margins of the platen also serve to present a document in a flush condition to the platen. These features substantially reduce the buckling and out of focus imaging of prior art document handlers using mechanically loaded friction belts to deliver documents to an imaging station of an image input terminal. Further, by using members having a greater width the load on the belt is more evenly distributed, but at the same time concentrated at critical margin areas of the imaging surface. Thus, an improved platen transport for use with document handlers of image input terminals has been disclosed hereby.

We claim:

1. A document handling system adapted to deliver successive documents having a generally planar surface to an imaging station of an input image terminal, comprising:

a substantially planar surface proximate the imaging station;

a driven belt, positioned over said substantially planar surface proximate to the imaging station in a movement direction; and means, positioned in contact with said belt over an extended surface area, for urging said belt into engagement with successive documents to frictionally advance successive documents over said substantially planar surface to the imaging station, said urging means being movable in a direction substantially transverse to the planar surface of the documents during advancement of the documents by said belt, said urging means comprises a first generally planar elongated member having a surface adapted to engage a minor area of said belt as said belt moves over the imaging station and a second generally planar elongated member contacting said belt over an extended minor surface area thereof, said second elongated member being substantially spaced from said first elongated member, said first elongated member and said second elongated member having longitudinal axes which are parallel to the movement of the belt to reduce wear on said substantially planar surface and improve the advancement of documents to the imaging station.

2. The document handling system of claim 1 wherein said first mentioned elongated member and said second elongated member are positioned toward opposed edges of said belt and extend over a substantial portion of the width of the imaging station.

3. The document handling system of claim 2, wherein said urging means further comprises a series of elongated rollers contacting said belt, each of said rollers having a longitudinal axis substantially perpendicular to the direction of belt travel, and each of said rollers substantially span the space between said first mentioned elongated member and said second elongated member.

4. The document handling system of claim 2 wherein said urging means comprises first and second portions positioned proximate to the lead and exit edges of the imaging station.

5. The document handling system of claim 4, wherein said urging means further comprises a bracket extending between said first and second portions.

6. The document handling system of claim 5, wherein said urging means further comprises a second bracket connecting said first and second portion to define an aperture.

7. The document handling system of claim 4, wherein said first portion and said elongated members have an upwardly extending surface positioned over an upstream section of the imaging station with respect to the movement of said belt.

8. The document handling system of claim 4, wherein said urging means further comprises a third generally planar elongated member disposed between said first mentioned elongated member and said first and second portions.

9. The document handling system of claim 8, wherein said urging means further comprises a fourth elongated member disposed between the first and second portions and said second elongated member.

10. The document handling system of claim 1, further comprising a belt transport frame for operatively supporting said belt, wherein said planar members are ski shaped members supported by said frame so that said ski shaped members bear on said belt.

11. In a document feeder for an imaging platen of a printing apparatus, in which document sheets must be fed over the imaging platen in a document feeding direction with a frictional platen belt transport, with a belt normal force system for urging the platen belt transport towards the imaging platen while the document sheets are being fed over the imaging platen by the platen belt transport, the improvement in the belt normal force system comprising at least two separate and substantially spaced apart elongated ski members extending in the document feeding direction and engaging only selected minor areas of the belt extending in the document feeding direction to provide a normal force only in the selected minor areas of the belt, to reduce wear yet provide adequate normal force for the document sheets being fed over the imaging platen by the platen belt transport.

* * * * *